United States Patent [19]

Fujita

[11] Patent Number: 4,743,823
[45] Date of Patent: May 10, 1988

[54] METHOD AND DEVICE FOR CORRECTING BACKLASH

[75] Inventor: Jun Fujita, Numazu, Japan

[73] Assignee: Toshiba Machine Co., Ltd., Tokyo, Japan

[21] Appl. No.: 920,122

[22] Filed: Oct. 17, 1986

[30] Foreign Application Priority Data

Oct. 17, 1985 [JP] Japan .................................. 60-232104

[51] Int. Cl.$^4$ ............................................. G05B 11/01
[52] U.S. Cl. .................................. 318/630; 340/347 P
[58] Field of Search ...................... 318/630; 340/347 P

[56] References Cited

U.S. PATENT DOCUMENTS

| 4,042,869 | 8/1977 | Eickelberg et al. | 318/630 |
| 4,502,108 | 2/1985 | Nozawa et al. | 318/630 X |
| 4,504,832 | 3/1985 | Conte | 340/347 P |

*Primary Examiner*—William M. Shoop, Jr.
*Assistant Examiner*—Saul M. Bergmann
*Attorney, Agent, or Firm*—Cushman, Darby & Cushman

[57] ABSTRACT

A method and apparatus for correcting backlash are disclosed. The backlash width which may occur in the driving device is predetermined and one of the movable directions is selected as a reference moving direction. Further, the state where a movement is made in the reference direction, i.e. the state where the driving device and the driven member come into contact with each other and the positional relationship is unambiguously determined, is made to be a reference state. In this state, a position setting is made that a position detected by a position detector of an absolute position detector secured to the side of the driving means and a position of the driven member coincide with each other. When the operation is performed, a moving direction of an action carried out in response to a movement command immediately after power up is compared with the preset reference moving direction and if both directions do not coincide with each other an excessive movement by the value of the backlash width is made. Accordingly, the actual position of the driven member after the movement and the position detected by the output position detector always coincide with one another irrespective of the state before the power up.

6 Claims, 3 Drawing Sheets

METHOD AND DEVICE FOR CORRECTING BACKLASH

BACKGROUND OF THE INVENTION

1. Field of the Invention

This invention relates to a method and a device wherein, in controlling a position of a driven member by use of an absolute position detector, a backlash is corrected which serves as a principal cause of an error occurring between a detected position of a predetermined portion in a driving source, a transmission device or the like and an actual position of the driven member.

2. Description of the Prior Art

In general, in controlling a position of a driven member moved by a driving source and a transmission device, it is necessary to detect the position of the driven member, however, it is rarely the case that an actual position of the driven member is directly detected.

From this reason, there has heretofore been indirectly detected the actual position of the driven member by a detector provided on the driving source or the transmission device. However, a mechanical section such as the transmission device is interposed between a portion detected by the detector and the driven member, and, when the moving direction is changed, an error due to a so-called backlash occurs, so that the detected position in the transmission device and the like need not necessarily coincide with the actual position of the driven member.

For example, in FIG. 5, a ball screw 11 as being the transmission device is moved by a driving source, not shown, and its position is detected by a detector, while, a table 12 is moved by the ball screw 11. FIG. 5 shows the state after the transfer thereof to the right, and a backlash width B formed between the ball screw 11 and the table 12 exist to the left of the ball screw 11. Here, when the table 12 is moved to the right by a distance D, if the ball screw 11 is moved by a distance D to the right as shown in FIG. 6, the table 12 is moved similarly. However, when the moving direction is changed to move the table 12 to the left by the distance D, as shown in FIG. 7, even if the ball screw 11 is moved by the distance D to the left, the table 12 moves only by (D-B) due to the presence of the backlash width B. In order to correct the shortage of the backlash width B due to the change in the direction, an excessive movement commensurate to the value of the backlash width B is made, only when the moving direction is changed. The correction of the type described has heretofore been called the backlash correction.

Now, as a detector for detecting a position of the ball screw 11, there has heretofore been used an increment type position detector. The increment type position detector is adapted to ouput a relative movement value as the detected data, and, when an absolute position serving as a reference position is not given, it has been necessary to set a reference point prior to the action, i.e. at the time of a power up. For this, in the device using the conventional increment type position detector, immediately after the power up, an origin returning action is performed to set the reference point in a numerically controlled machine tool, thus enabling to detect the position. Further, at the time of the power up, it is unclear that the positional relationship between the ball screw 11 and the table 12 within the range of the backlash width B is. However, in the case immediately after making the above-described origin returning action, there is no backlash between the ball screw 11 and the table 12, so that the positional relationship between the ball screw 11 and the table 12 is unambiguously determined.

Now, it is wasteful in the terms of time to perform the origin returning action at the time of each power up, which has been a considerable obstacle for the improvements in the working efficiency. In this respect, the absolute position detector, which has been widely used, is advantageous in that the detector has higher accuracy, and the position can be detected immediately after the power up, so that the origin returning action can be dispensed with.

However, when the origin returning action is to be dispensed with at the time of the power up by the use of the absolute position detector which is connected to the ball screw 11, the position of the ball screw 11 may be detected immediately after the power up, however, when the table 12 is shifted in position from the ball screw 11 within the range of the backlash width B at the time of the power up, it is impossible to determining the position of the table 12 within the range of the backlash width B, thus resulting in the disadvantage that an error commensurate to the value of the backlash width B at the maximum occurs between the detected position of the ball screw 11 and the actual position of the table 12 as being the driven member.

SUMMARY OF THE INVENTION

An object of the present invention is to provide a method and a device wherein, by use of an absolute position detector, necessity for an origin returning action at the time of the power up is eliminated and an error caused by a backlash at the time of the power up is corrected.

According to the present invention, the backlash width which may occur in the driving means is predetermined, one of the movable directions is selected as a reference moving direction, further, the state where a movement is made in the reference moving direction, i.e. the state where the driving means and the driven member come into contact with each other and the positional relationship is unambiguously determined is made to be a reference state, and, in this state, such a setting is made that a position detected by the absolute position detector secured to one of the driven member and the driving means and a position of the other may coincide with each other. Here, when the operation is performed, a moving direction of an action carried out in response to a movement command immediately after the power up is compared with the preset reference moving direction, and, if the both directions do not coincide with each other, an excessive movement by the value of the backlash width is made. Owing to this, the actual position of the driven member after the movement and the position detected by the absolute position detector always coincide with each other irrespective of the state before the power up.

The device for correcting a backlash according to the present invention is the one for correcting a backlash as being a principal cause of an error occurring between the detected position obtained by the absolute position detector provided on one of the driving means and the driven member and the position of the other in controlling the position of the driven member moved by the driving means, said device comprising: means for storing the backlash width; means for storing the reference moving direction of the driven member; means for storing the detected position given by the absolute position detecting means; and means for writing back the detected position to determine a movement target position of the driven member when a command to move the driven member in the reference moving direction is given to the driving means, while adding the value of the backlash width to determine the movement target position when a command to move the driven member in a direction reverse to the reference moving direction is given to the driving means.

DETAILED DESCRIPTION OF THE PREFERRED EMBODIMENT

As one embodiment of the present invention, an embodiment wherein the present invention is applied to table feed control of a numerically controlled machine tool using an absolute position detector will hereunder be described with the accompanying drawings.

Figure 1:
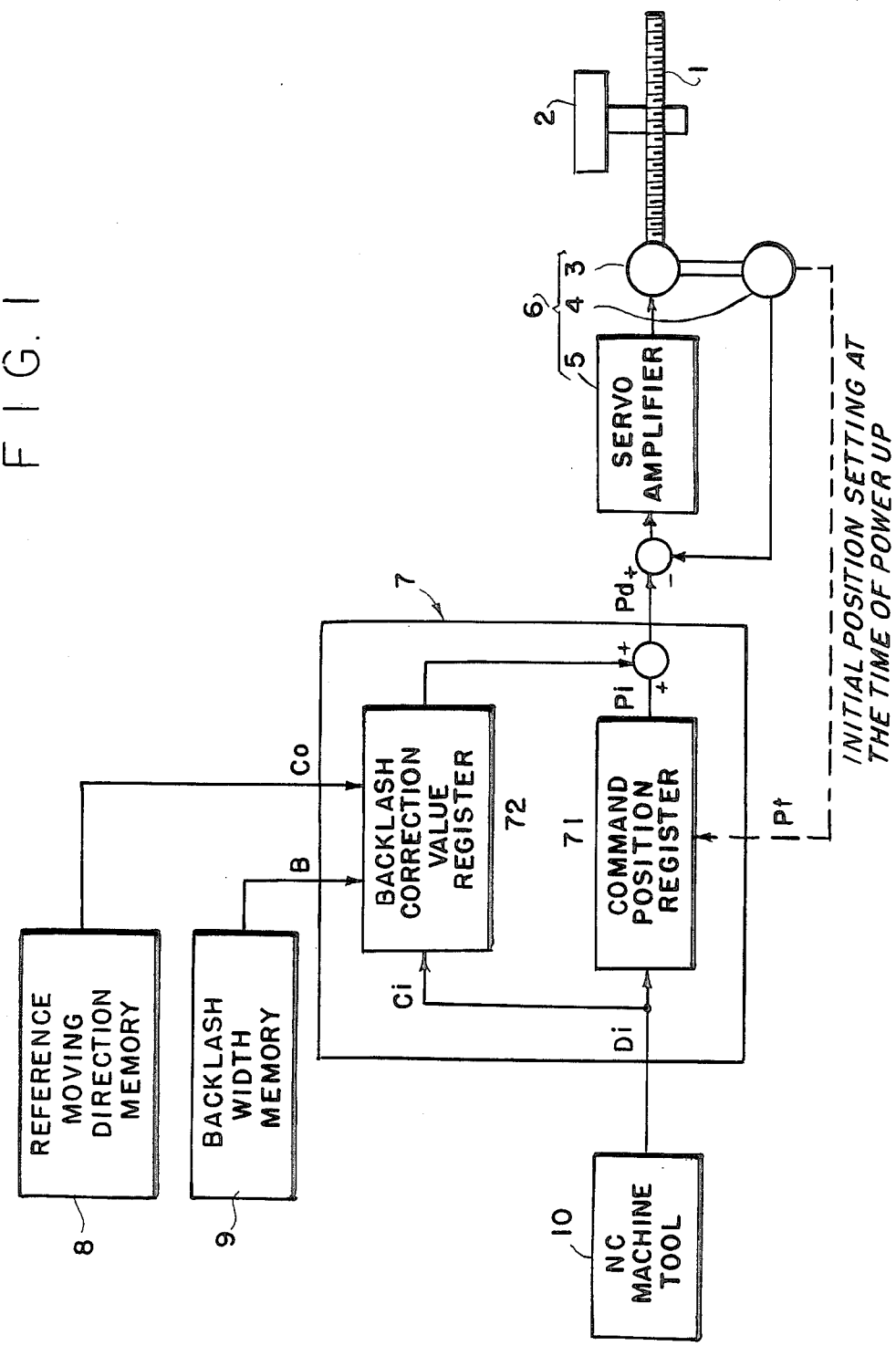
FIG. 1 is a block diagram showing one embodiment of the present invention.

In FIG. 1, fixed onto the table 2 as being a driven member is a material, not shown, which is a subject to be worked on. The table and the material, which are formed integrally, are driven by rotation of a ball screw 1 as being a transmission device constituting driving means so as to be movable to the right and left in the drawing. The ball screw 1 is connected to a rotary shaft of a motor 3 as being a driving source constituting driving means with the transmission device. Connected to this rotary shaft is an absolute position detector 4. The ball screw 1 and the rotary shaft of the motor 3 are integrally rotatable. Further, the motor 3 and the absolute position detector 4 are connected to a servo amplifier 5, respectively, to form a position control servo mechanism 6. The servo amplifier 5 is connected to a numerically controlled machine tool 10 through a backlash corrector 7.

The backlash corrector 7 is comprised of TTL or any other logic so as to perform the processing on the basis of the correcting method according to the present invention. The backlash corrector 7 is provided thereon with a command position register 71 and a backlash correction value register 72, which are constructed such that numerical values required in the above processing sections are held. The backlash corrector 7 is connected thereto with a reference moving direction memory 8 and a backlash width memory 9 from the outside.

In the equipment with the above arrangement, the reference state is set prior to the operation.

Figure 2:
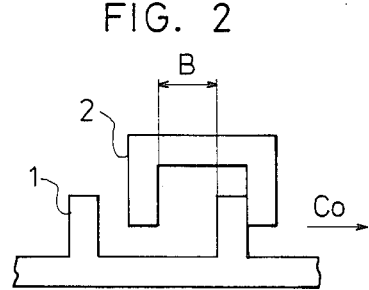
FIG. 2 is a typified diagram showing the reference state of the above embodiment.

In FIG. 2, the table 2 being in the state after its movement to the right is in contact with the ball screw 1. This state is selected as the reference state. For example, if the increasing direction of the coordinate axis of the detected position is selected as the reference moving direction, then, as a reference moving direction $C_o$, 1 is stored in the reference moving direction memory 8. On the contrary, if the decreasing direction of the coordinate axis of the detected position is selected as the reference moving direction, then, as a reference moving direction $C_o$, $-1$ is stored in the reference moving direction memory 8. The axis of coordinate of the detected position is adjusted such that the backlash width B in the drawing is measured and stored in the backlash width memory 9, and further, the position of the driven member on the table 2 and the position detected by the absolute position detector 4 coincide with each other.

When the equipment thus set is operated, an initializing action is performed immediately after the power up. At this time, in this equipment, no mechanical action such as the origin returning action is performed, a detected position $P_t$ is read out of the absolute position detector 4, and stored in the command position register 71. At this time, when a first movement command $D_i$ after the power up, which is delivered from the numerically controlled machine tool 10, is added to a detected position $P_t$ stored in the command position register 71, written back into the command position register 71 as a command position $P_i$, which is compared with a moving direction $C_i$ of the movement command $D_i$ and the reference moving direction $C_o$ preset in the reference moving direction memory 8, and the processing in accordance with the result is performed. More specifically, if the moving direction $C_i$ coincides with the reference moving direction $C_o$, then the command position $P_i$ held in the command position register 71 is selected as the target position $P_d$ as it is. If not, then the backlash width B preset in the backlash width memory 9 is written into the backlash correction value register 72, and the command position $P_i$ held in the command position register 71 on the basis of the moving direction $C_i$ is corrected and selected as the target position $P_d$. The target position $P_d$ thus determined is transferred from the backlash corrector 7 to the position control servo mechanism 6, whereby the table 2 is accurately forwarded to a position corresponding to the target position $P_d$ by the motor 3.

Figure 3:
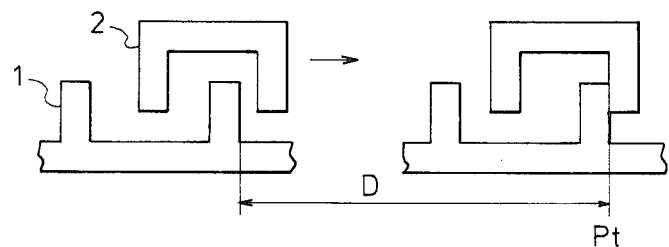
FIGS. 3 and 4 are typified diagrams showing the action in the above embodiment.
Figure 4:
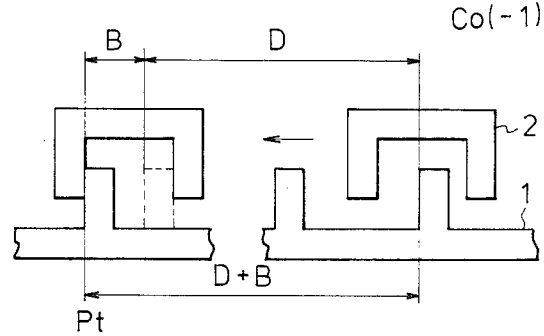
Figure 5:
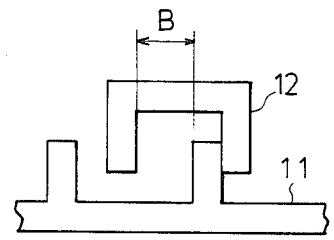
FIGS. 5, 6 and 7 are typified diagrams showing the action of the prior art, respectively.
Figure 6:
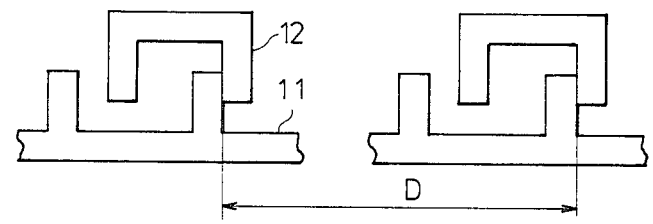
Figure 7:
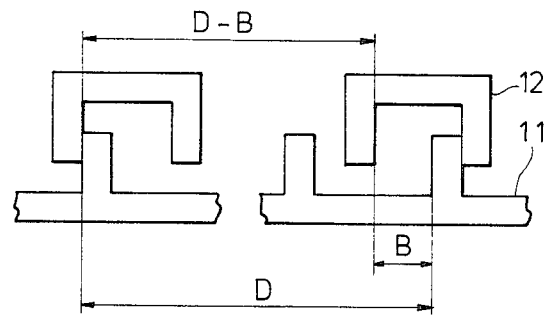

FIGS. 3 and 4 show the patterns of the action. More specifically, in FIG. 3 where the movement to the right as being the reference moving direction $C_o$ is shown, the ball screw 1 and the table 2 are in the reference state even after the movement, and, the actual position of the driven member is the target position $P_d$, similarly to the detected position. On the other hand, in the FIG. 4 where the leftward movement reverse to the reference moving direction $C_o$ is shown, the ball screw 1 is on the target position $P_d$, the actual position of the driven member is shifted to the right by the value of the backlash width B from the target position $P_d$, however, the target position $P_d$ is corrected to excessively move the value of the backlash width B, so that the actual position of the driven member can coincide with the command position $P_i$.

Upon completion of the series of the initializing operations, the normal operation accompanied by the backlash correction is performed as referenced from the command position $P_i$ and the moving direction $C_i$, as in the past, only when the moving direction $C_i$ is changed.

As described above, in this embodiment, use of the absolute position detector 4 makes it possible to make an accurate positioning even if the origin returning action immediately after the power up is dispensed with. It becomes possible to start the operation immediately after the power up with the origin returning action being dispensed with, whereby a waiting period at the time of start of the operation or the restart of the operation after the stop of operation due to the interruption of service can be reduced, thus improving the working efficiency.

In the above embodiment, the backlash corrector 7 has been formed of the TTL or some other logic, however, similar correction may be achieved by combining a microprocessor programmed to realize the similar function and a main memory. In short, according to the present invention, the backlash width and the reference moving direction are predetermined and stored, in response to the movement command immediately after the power up, a movement is made in response to a movement command when the moving direction coincides with the reference moving direction, and, an excessive movement by the value of the backlash width is made in addition to the movement command when the moving direction is reverse to the reference moving direction.

Description has been given of the embodiment wherein the absolute position detector is provided on the driving means, however, the present invention need not necessarily be limited to this. Namely, the absolute position detector may be provided on the driven section Further, the driven member need not necessarily move rectilinearly, but may be driven in a direction of rotation or any other direction.

As has been described hereinabove, the present invention is advantageous in that positioning may be made by use of the absolute position detector, so that the backlash of the equipment for driving the driven member can be corrected.

What is claimed is:

1. A method of correcting a backlash serving as a principal cause of an error occurring between a position detected by an absolute position detector having a detecting portion provided on the side of a driving means and a position of a driven member moved by said driving means, comprising the steps of:
    storing a backlash width;
    storing a reference moving direction;
    issuing a movement command immediately after a power up;
    moving said driven member in response to said movement command a predetermined amount to a target position when the moving direction of said driven member coincides with a stored reference moving direction; and
    moving said driven member by an amount equal to the value of the backlash width in addition to the predetermined amount in response to said movement command when the moving direction is the reverse of the reference moving direction.

2. A method of correcting a backlash as set forth in claim 1, wherein each said step of moving said driven member comprises linearly moving the driven member.

3. A method of correcting a backlash as set forth in claim 1, further comprising the steps of storing a position detected by said absolute position detector and writing back said detected position to determine said target position of said driven member when a command to move said driven member in the reference moving direction is given to said driving means.

4. A method of correcting a backlash as set forth in claim 1, further comprising the step of determining said target position by comparing the moving direction of said movement command with the reference moving direction.

5. A device for correcting a backlash serving as a principal cause of an error occurring between a position detected by an absolute position detector having a detecting portion provided on the side of a driving means and a position of a driven member moved by said driving means, comprising:
    means for storing said backlash width;
    means for storing a reference moving direction of said driven member;
    means for storing a detected position given by said absolute position detecting means; and
    means for writing back said detected position to determine a movement target position of said driven member when a command to move said driven member in the reference moving direction is given to said driving means, while, adding said backlash width to determine said movement target position when a command to move said driven member in a direction reverse to said reference moving direction is given to said driving means.

6. A device for correcting a backlash as set forth in claim 5, wherein said driven detection is rectilinearly movable.

* * * * *